E. A. MERCER & J. D. C. POWNALL.
NUT-LOCK AND WASHER.
No. 190,443. Patented May 8, 1877.
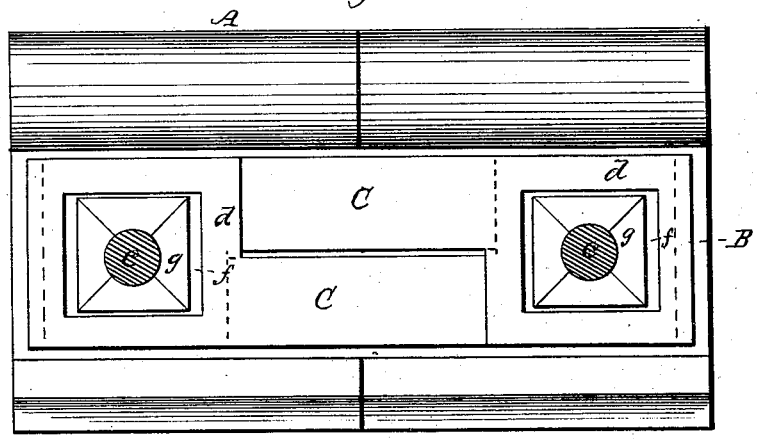
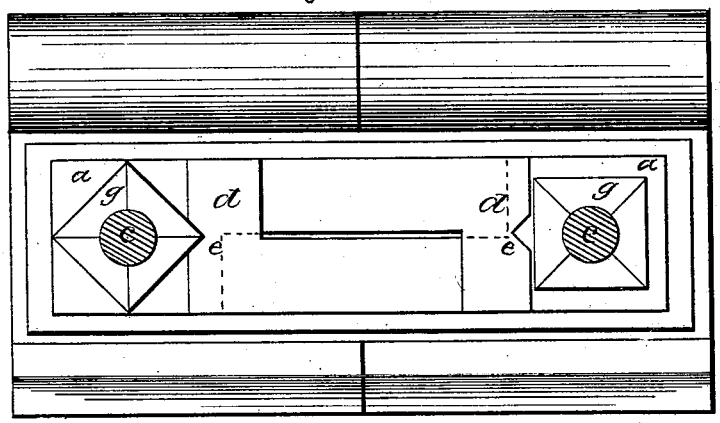
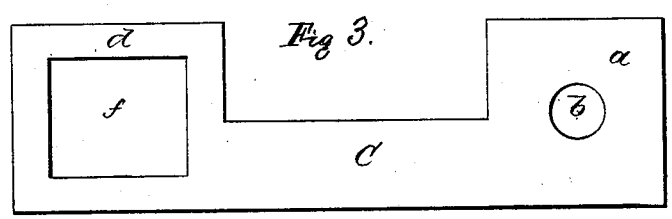

UNITED STATES PATENT OFFICE.

EVAN A. MERCER AND JOSEPH D. C. POWNALL, OF CHRISTIANA, PA.

IMPROVEMENT IN NUT-LOCKS AND WASHERS.

Specification forming part of Letters Patent No. 190,443, dated May 8, 1877; application filed April 14, 1877.

*To all whom it may concern:*

Be it known that we, EVAN A. MERCER and JOS. D. C. POWNALL, of Christiana, in the county of Lancaster and State of Pennsylvania, have invented a new and valuable Improvement in Nut-Lock and Washers; and we do hereby declare that the following is a full, clear, and exact description of the construction and operation of the same, reference being had to the annexed drawings, making a part of this specification, and to the letters and figures of reference marked thereon.

Figure 1 of the drawing is a representation of a side elevation of my invention. Fig. 2 is a modification of the same. Fig. 3 is a detached view of one of the locking-plates.

This invention has relation to means for locking nuts upon their bolts used for the purpose of securing fish-plates to the sections of rails; and the invention consists in two metal plates, secured over the ends of the bolts, and overlapping each other at their ends, said ends running at right angles to the length of the plates, and forming, when in position against the nuts, locks for the same, as will be hereinafter described, and subsequently pointed out in the claims.

In the accompanying drawings, A represents the two sections of a rail, and B the usual fish-plates. The two metal plates C, which form the subject of my invention, have at one of their ends washers $a$, and a suitable hole, $b$, in each plate, for passing it over the end of the bolts $c$ after the bolts have been passed through the rails and fish-plates. The plates C at their other ends have short plates $d$ with V-shaped notches $e$; or, if desired, as a modification of this form, the ends $d$, which in both instances run at right angles to the plates C, may have a square, oblong, or other form of opening, $f$, to correspond with the shape and size of the nuts $g$, and after the plates C have been secured over the bolts, and the nuts screwed down upon the washer end $a$, the plates C can be sprung over the nuts, and will then firmly retain them in position, and prevent them from turning. The V-shape notch $e$ in the plate $d$ admits of the nut being locked by the plates in eight different positions, the V-shape notch $e$ receiving the corner of the nut while the flat sides are brought in contact with the square ends of the plates $d$.

It will be seen that the plates when sprung over each other make a perfect locking device for the nuts, the end of each plate pressing down upon the end of the other.

Having now fully described our invention, what we claim as new, and desire to secure by Letters Patent, is—

1. A nut-locking device, consisting of the plates C, having washers $a$ and opening $b$, and the short plate $d$, said plates sprung over each other, substantially as and for the purpose specified.

2. The plates C, having washers $a$ and holes $b$, and the ends or plates $d$, with openings $f$, said plates $d$ sprung over the nuts, substantially as and for the purpose set forth.

In testimony that we claim the above we have hereunto subscribed our names in the presence of two witnesses.

EVAN A. MERCER.
    JOS. D. C. POWNALL.

Witnesses:
 BRINTON WALTER,
 ELLEN S. WALTER.